US008483775B2

(12) United States Patent
Buck et al.

(10) Patent No.: US 8,483,775 B2
(45) Date of Patent: *Jul. 9, 2013

(54) VEHICLE COMMUNICATION SYSTEM

(75) Inventors: Markus Buck, Biberach (DE); Tim Haulick, Blaubeuren (DE); Gerhard Uwe Schmidt, Ulm (DE); Michael Tropp, Ulm (DE)

(73) Assignee: Nuance Communications, Inc., Burlington, MA (US)

( * ) Notice: Subject to any disclaimer, the term of this patent is extended or adjusted under 35 U.S.C. 154(b) by 19 days.

This patent is subject to a terminal disclaimer.

(21) Appl. No.: 13/240,424

(22) Filed: Sep. 22, 2011

(65) Prior Publication Data

US 2012/0009878 A1    Jan. 12, 2012

Related U.S. Application Data

(63) Continuation of application No. 11/492,675, filed on Jul. 25, 2006, now Pat. No. 8,036,715.

(30) Foreign Application Priority Data

Jul. 28, 2005    (EP) .................................... 05016443

(51) Int. Cl.
*H04M 1/00* (2006.01)

(52) U.S. Cl.
USPC .............. 455/569.2; 455/456.4; 455/3.06; 455/421; 455/569.1; 455/570; 381/300; 381/302

(58) Field of Classification Search
USPC .............. 455/569.2, 569.1, 570, 99, 3.06, 455/245.1, 230, 422.1, 431, 575.9, 575.6, 455/556.1–557, 334–345, 421, 456.4, 456.6, 455/550.1, 55, 6.2, 88; 340/425.5, 426.1–426.2; 381/302, 79, 85–86

See application file for complete search history.

(56) References Cited

U.S. PATENT DOCUMENTS

| 5,131,050 | A | 7/1992 | Naslund ........................ 381/82 |
| 5,404,391 | A | 4/1995 | Wavroch et al. .............. 455/567 |
| 5,490,205 | A | 2/1996 | Kondo et al. ................ 379/67.1 |
| 5,678,200 | A | 10/1997 | Levi ................................ 455/88 |
| 5,867,794 | A | 2/1999 | Hayes et al. ................. 455/557 |
| 6,176,837 | B1 | 1/2001 | Foxlin ........................... 600/595 |
| 6,377,825 | B1 | 4/2002 | Kennedy et al. .......... 455/569.2 |
| 6,409,687 | B1 | 6/2002 | Foxlin ........................... 600/595 |
| 6,453,180 | B1 | 9/2002 | Endoh et al. ................. 455/567 |
| 6,505,057 | B1 | 1/2003 | Finn et al. .................... 455/569 |
| 6,519,479 | B1 | 2/2003 | Garudadri et al. ........... 455/563 |
| 6,655,749 | B2 * | 12/2003 | Bond et al. ....................... 303/9 |
| 6,990,211 | B2 | 1/2006 | Parker ........................... 381/310 |
| 7,130,430 | B2 | 10/2006 | Milsap ............................ 381/77 |

(Continued)

FOREIGN PATENT DOCUMENTS

| WO | WO 00/30266 | 5/2000 |
| WO | WO 01/03413 | 1/2001 |

*Primary Examiner* — Vladimir Magloire
*Assistant Examiner* — Babar Sarwar
(74) *Attorney, Agent, or Firm* — Sunstein Kann Murphy & Timbers LLP

(57) ABSTRACT

A vehicle communication system detects the presence of a passenger wearable communication device. The system receives audio signals from multiple sources inside or outside of a vehicle. The system processes the signals before routing the signals to multiple destinations. The destinations may include wearable personal communication devices, front and/or rear speakers, and/or a remote mobile device.

14 Claims, 10 Drawing Sheets

U.S. PATENT DOCUMENTS

| | | | |
|---|---|---|---|
| 7,379,522 B2 | 5/2008 | Narathong et al. | 377/47 |
| 7,474,264 B2 * | 1/2009 | Bolduc et al. | 342/463 |
| 7,492,913 B2 | 2/2009 | Connor et al. | 381/77 |
| 8,036,715 B2 | 10/2011 | Buck et al. | 455/569.2 |
| 2001/0041600 A1 | 11/2001 | Becker et al. | 455/567 |
| 2003/0032460 A1 | 2/2003 | Cannon et al. | 455/569 |
| 2003/0045816 A1 | 3/2003 | Foxlin | 600/595 |
| 2003/0063756 A1 | 4/2003 | Geerlings et al. | 381/86 |
| 2003/0104843 A1 | 6/2003 | Geren et al. | 455/569 |
| 2004/0070286 A1 | 4/2004 | Marzano | 310/12 |
| 2004/0101146 A1 | 5/2004 | Laitinen et al. | 381/77 |
| 2004/0179694 A1 | 9/2004 | Alley | 381/55 |
| 2004/0204168 A1 | 10/2004 | Laurila | 455/569.1 |
| 2005/0064835 A1 * | 3/2005 | Gusler et al. | 455/245.1 |
| 2006/0023892 A1 | 2/2006 | Schultz | 381/58 |
| 2006/0111154 A1 * | 5/2006 | Tran | 455/569.2 |

* cited by examiner

VEHICLE COMMUNICATION SYSTEM

CROSS-REFERENCE TO RELATED APPLICATIONS

This application is a continuation of U.S. Ser. No. 11/492,675, entitled "Vehicle Communication System," filed Jul. 25, 2006, which in turn claims the benefit of priority from European Patent Application No. 05016443.3, filed Jul. 28, 2005.

Each of the above-described applications is hereby incorporated by reference herein in its entirety.

TECHNICAL FIELD

The invention relates to audio signal processing, and more particularly, to a vehicle communication system.

BACKGROUND ART

1. Technical Field

The invention relates to audio signal processing, and more particularly, to a vehicle communication system.

2. Related Art

Rapid advances in technology have lead to the adoption of extensive audio, video, and information systems in vehicles. The systems output navigational assistance, traffic reports, reports on vehicle status, play music, and play videos. The use of some many devices can create the devices, along with the configuration of a vehicle passenger compartment—which can result in complex reverberations and may be susceptible to transient vehicle noises.

To improve vehicle communications, some vehicles incorporate specific vehicle communication systems. A vehicle communication system may receive audio data representing a passenger's speech, process the received audio data, and redirect the processed audio data to vehicle passengers through vehicle speakers. Due to the positioning of audio inputs, the shape of the passenger compartment, and the configuration of the vehicle speakers, some systems may generate acoustic feedback.

In some instances, suppression and/or compensation filters are used to reduce feedback. The use of suppression and/or compensation filters may be complex and may require reconfiguration. When reconfigurations are not performed quickly, audible interference may be passed to the listener. As a result, some vehicle communication systems may reproduce speech signals that are difficult to understand.

Therefore, a need exists for an improved vehicle communication system.

SUMMARY OF THE EMBODIMENTS

The vehicle communication system improves in-vehicle communications. The system detects the presence of a wearable communication device. The system may receive audio data from multiple sources inside or outside of a vehicle and may selectively route the audio data to multiple destinations that may include wearable personal communication devices, front and/or rear speakers, and/or a remote mobile device. A wearable personal communication device may transmit and/or receive audio data to/from sources within the vehicle or outside of the vehicle.

A vehicle communication system includes a signal processing logic and a controller in communication with the signal processing logic. The signal processing logic receives, processes, and outputs audio data. The controller detects a wearable personal communication device within the vehicle and may selectively route the output audio data to a detected wearable personal communication device and/or through the vehicle's audio system.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF SPECIFIC EMBODIMENTS

A vehicle communication system may detect the presence of one or more wearable personal communication devices ("communication device"). Based on the location of the communication devices, the vehicle communication system may either physically or virtually (e.g., through software) decouple vehicle inputs and/or vehicle outputs. The inputs and/or outputs may be positioned near a detected communication device. When a communication device is detected, the vehicle communication system may establish a communication path with the detected communication device. The vehicle communication system may receive audio data from a communication device, a vehicle input, and/or a vehicle information source. The vehicle communication system may transmit audio data to a communication device, a vehicle output, and/or a vehicle information source. Because some communication devices are wearable, an input and/or output associated with the communication device may be positioned closer to a user then an input and/or output within the vehicle. Therefore, audio data received from a communication device may have an increased signal-to-noise ratio, and audio data output to a communication device may be played at an increased volume with little or no effect feedback.

Figure 1:
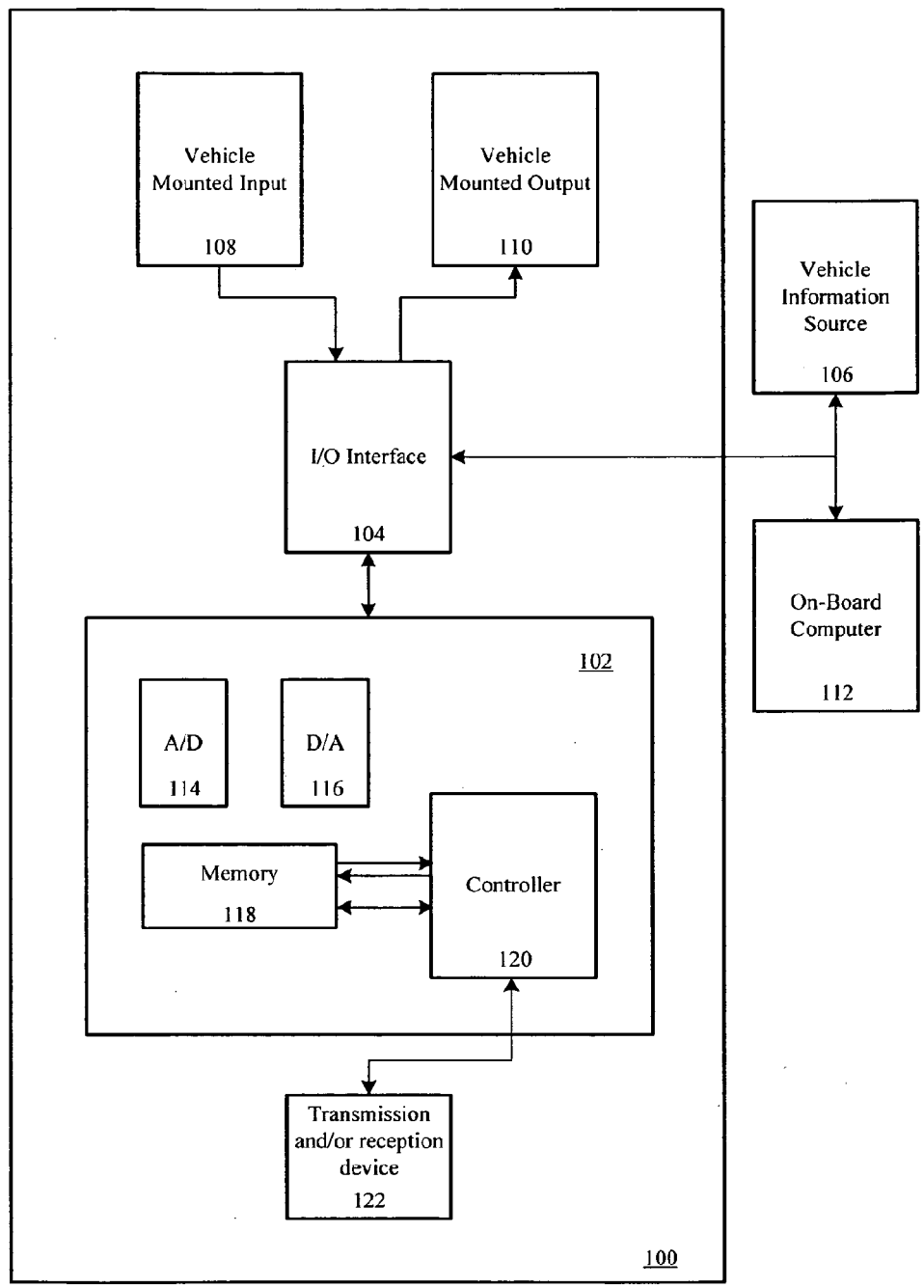
FIG. 1 shows a vehicle communication system.

FIG. 1 shows a vehicle communication system 100. The vehicle communication system 100 may include hardware and/or software that is capable of running on one or more processors in conjunction with one or more operating systems. The system may include signal processing logic 102 which may receive audio data from one or more inputs, and transmits audio data through one or more outputs. The signal processing logic 102 may communicate with other devices through an Input/Output ("I/O") interface 104. The I/O interface 104 may accept digital or analog audio data, and may communicate with other devices through wired or wireless connections.

In FIG. 1, the I/O interface 104 may communicate with a vehicle information source 106, a vehicle input 108, a vehicle output 110, and/or an on-board computer 112. A vehicle information source 106 may include a radio receiver, a television receiver, a compact cassette player, a compact disc player, a digital video disc player, a video cassette player, a personal computer, a video game console, a telephone (mobile or fixed), a navigation system, or any other device that transmits and/or receives audio data. The number of vehicle information source 106 devices may vary.

A vehicle input 108 may include a microphone or a moveable media that detects sound waves and converts the sound waves into electrical energy, such as a microphone. A vehicle output 110 or loudspeaker may convert electrical energy into sound waves at low, mid-range, and/or high frequencies. The signal processing logic 102 may receive, process, and/or output audio data in either a digital or analog format. The signal processing logic 102 may include an analog-to-digital converter 114 and a digital-to-analog converter 116. These converters may be used by the signal processing logic 102 to convert the audio data into a desired format.

The I/O interface 104 may also facilitate communications between the signal processing logic 102 and a vehicle on-board computer 112, such as an electronic control module, a body control module, or an after market unit that is capable of communicating with the existing circuitry within a vehicle using one or more allowable protocols. Some protocols that the I/O interface 104 may process may include 1850VPW, J1850PWM, ISO, ISO9141-2, ISO14230, CAN High Speed CAN, MOST, LIN, IDB-1394, IDB-C, D2B, Bluetooth®, TTCAN, TTP, or FlexRay®.

Audio data received by the signal processing logic 102 may be stored in a memory 118. The signal processing logic 102 may access the memory 118 asynchronously or synchronously through one or more bi-directional and/or one or more uni-directional buses. The one or more buses may transmit data in parallel or series. The memory 118 may be partially or wholly a Read Only Memory ("ROM") a Random Access Memory ("RAM"), or any other type of volatile and/or nonvolatile storage space.

A controller 120 (e.g., processor, microprocessor, microcontroller, etc.) may communicate with the signal processing logic 102 and/or a transmission and/or reception device 122, such as a separate transmitter and/or receiver or a transceiver. The transceiver 122 may process coded and/or uncoded data representing audio data or control data. Transmissions between the transceiver 122 and a communication device may use one or more wireless protocols, such as Bluetooth®, 802.11b, 802.11j, 802.11x, Zigbee, Ultra Wide Band, Mobile FI, Wireless Local Area Network ("WLAN"), and/or Infrared Data Transmissions which may include the Infrared Data Association IrDa 1.0 standard which may provide high transfer rates, or the Infrared Data Association IrDa 1.1 standard which may provide higher transfer rates.

Through the transceiver 122, the controller 120 may exchange control data in half-duplex or full-duplex with a communication device. The controller 120 may analyze control data it receives to determine the type of wireless protocol being used by the communication device (e.g., whether the vehicle communication system 100 recognizes the communication device). For instance, the controller 120 may access the memory 118 asynchronously or synchronously through one or more bi-directional and/or unidirectional buses. Data may be transmitted between the controller 120 and the memory in parallel or series. The controller 120 may compare some or all of the received control data to pre-stored protocols recognized by the vehicle communication system 100. If a match is identified, the controller 120 may transmit an acknowledgement to the communication device. If after cycling through the pre-stored protocols, no match is found, the controller 120 may indicate that the vehicle communication system is not pre-programmed to recognize the communication device. This signal may be transmitted to a user through an output device or a vehicle information source 106 which may prompt a user to enter configuration information.

Additionally, the controller 120 may analyze some or all of the received control data to determine communication device parameters. The communication device parameters may include information such as a communication device's wireless signal strength and/or the device's configuration (e.g., whether the communication device is configured with an input, such as a microphone; an output, such as a loudspeaker; or both). The controller 120 may use these parameters alone or in addition to other vehicle sensor data, such as weight sensors that may identify where passengers are positioned within the vehicle, to configure the vehicle communication system 100.

For instance, the controller 120 may compare a communication device's signal strength to one or more threshold values. The result of the comparison may indicate to the controller 120 the location of the communication device within the vehicle. Based on the location of a detected communication device, the controller 120 may transmit a logic control signal to the signal processing logic 102. The logic control signal may indicate which vehicle microphones 108 and loudspeakers 110 are to be decoupled, and which channels of the transceiver 122 should be used to communicate with a detected communication device.

Figure 2:
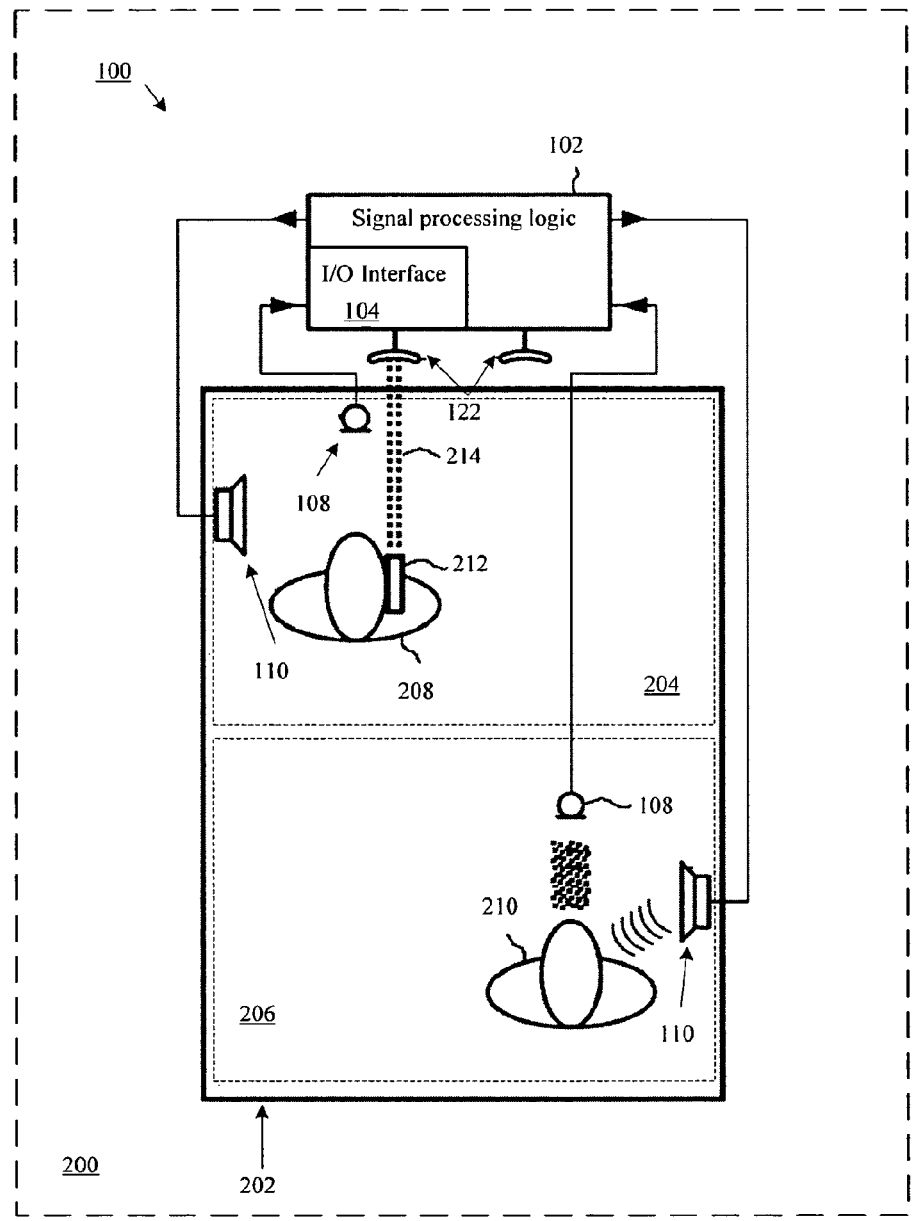
FIG. 2 is a vehicle communication system within a vehicle.

FIG. 2 shows a vehicle communication system 100 within a vehicle 200. In FIG. 2, one communication device is detected. The vehicle 200, comprising a device to transport persons and/or things, may include an enclosed compartment 202. The enclosed compartment 202 may be divided into different zones, such as a front zone 204 and a rear zone 206. A first passenger 208 is positioned in the front zone 204 while a second passenger 210 is positioned in the rear zone 206. Situated in both the front zone 204 and the rear zone 206 are a vehicle input 108, such as a microphone, and a vehicle output 110, such as a loudspeaker. The microphone 108 and loudspeaker 110 of both the front 204 and rear 206 zones may be integrated and may be in communication with the signal processing logic 102. In FIG. 2, the I/O interface 104 is shown as a unitary part of the signal processing logic 102. Transceivers 122 are positioned to receive and/or transmit data between the signal processing logic 102 and a communication device 212.

In FIG. 2, the communication device 212 may be a wireless headset, a wireless telephone headset, a hands-free device, or other wearable device that includes an input and output device. The communication device 212 may include a power supply, a memory, signal processing logic, a transceiver a transmitter and receiver, and/or an input device and an output device, such as a microphone and loudspeaker, respectively. Data transmitted between the communication device 212 and the signal processing logic 102 is shown as data link 214. The data link 214 may be a bi-directional link or may include separate transmit and receive links. The data transmitted through the data link 214 may include control data and/or audio data transmitted according to one or more wireless protocols. In one system, the data link 214 may include radio frequency signals broadcast over a short distance, such as less than or equal to about 10 meters, and in the Instrumentation Scientific and Medical ("ISM") frequency band (e.g., 900 MHz, 1.8 GHz, 2.4 GHz, or 5.8 GHz) with a fast frequency hopping method of about 1600 frequency changes per second to provide a relatively high interference resistance. In other implementations, the data link 8 may include IrDa 1.0 or IrDa 1.1 infrared data transmissions.

In FIG. 2, the front zone 204 microphone 108 and loudspeaker 110 are decoupled from the signal processing logic 102. In this state substantially no audio data is received at the front zone 204 microphone 108 near the communication device 212. Similarly, substantially no audio data is output from the front zone 204 loudspeaker 110 near the communication device 212. A microphone 108 and loudspeaker 110 may be identified near or by a communication device 212, based on the location of the communication device 212 determined by the controller 120. Additionally or alternatively, a microphone 108 and loudspeaker 110 may be identified near or by a communication device 212 when the distance between a microphone 108 and/or loudspeaker 110 to the communication device 212 is less than the distance to other microphones and/or loudspeakers within the vehicle compartment 202.

Since the microphone 108 and loudspeaker 110 near the communication device 212 have been decoupled from the signal processing logic 102, audio data is received from and transmitted to the communication device 212 through the data link 214. Because no communication device was detected near the rear passenger 210, the rear zone 206 microphone 108 and loudspeaker 110 remain in communication with the signal processing logic 102.

Audio data from the front passenger 208 is received by the signal processing logic 102 through the data link 214 and is provided to the rear passenger 210 through the rear zone 206 loudspeaker 110. Additionally, audio data from any vehicle information source may be sent to the rear passenger 210 through the rear zone 206 loudspeaker 110. Audio data from the rear passenger 210 may be received by the signal processing logic 102 through the rear zone 206 microphone 108 and is sent to the front passenger 208 through the data link 214. Additionally, audio data from any vehicle information source may be sent to the front passenger 208 through the data link 214.

Because the microphone 108 and loudspeaker 110 located near the detected communication device 212 may be decoupled from the signal processing logic 102, feedback effects at this location may be substantially or completely eliminated. Consequently, the signal processing logic 102 may be simplified, and therefore more complex elements such as compensation and/or suppression filters may not need to be included in the signal processing logic 102.

Figure 3:
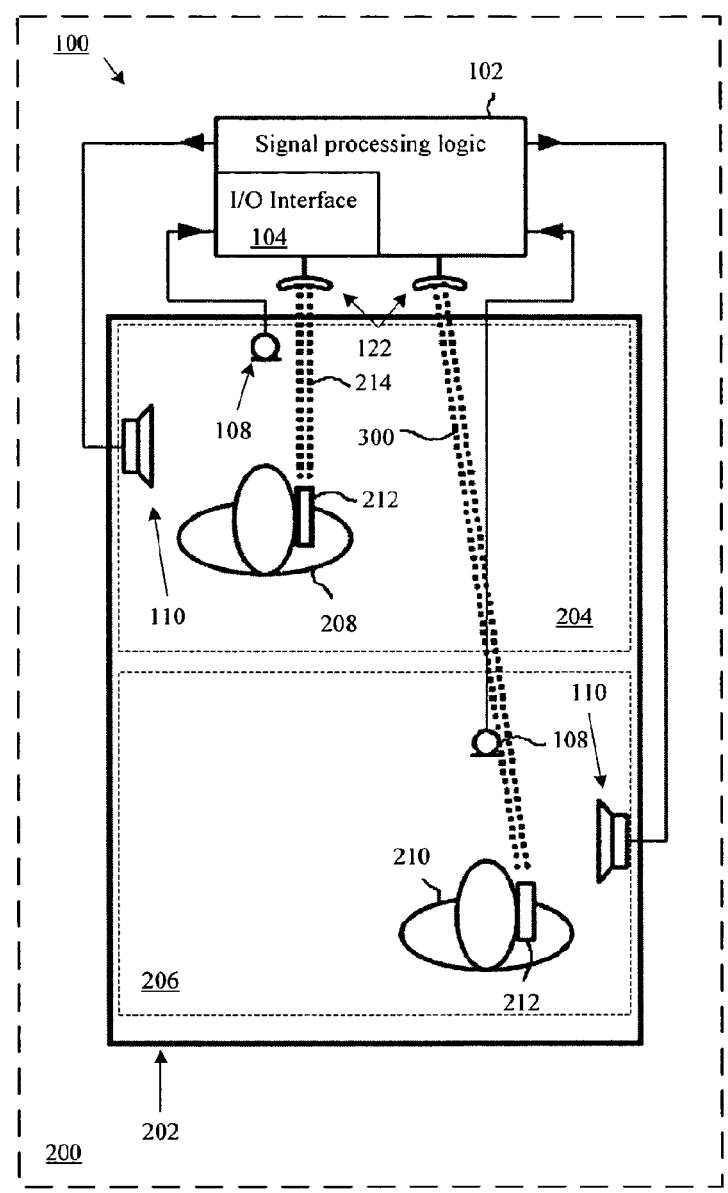
FIG. 3 is a vehicle communication system within a vehicle.

FIG. 3 shows a vehicle communication system 100 within a vehicle 200. In FIG. 3, the vehicle communication system 100 detects communication devices 212 in both the front zone 204 and the rear zone 206. The vehicle communication system 100 may decouple the microphone 108 and loudspeaker 110 in both the front 204 and rear 206 zones. Audio data is transmitted to and received from the communication device 212 located in the front zone 204 through the data link 214. The audio data received by the first passenger 208 may represent audio signals generated by a vehicle passenger, a vehicle information source, and/or an external source. The vehicle passenger may be the second passenger 210 wearing a communication device. Similarly, audio data is transmitted to and received from the communication device 212 located in the rear zone 206 through a data link 300. The audio data received by the second passenger 210 may represent audio signals generated by a vehicle passenger, a vehicle information source, and/or an external source. The vehicle passenger may be the first passenger 208 wearing a communication device. The data links 214 and 300 may operate according to a common protocol, or may operate through different protocols. In FIG. 3, the I/O interface 104 is shown as a unitary part of the signal processing logic 102.

Figure 4:
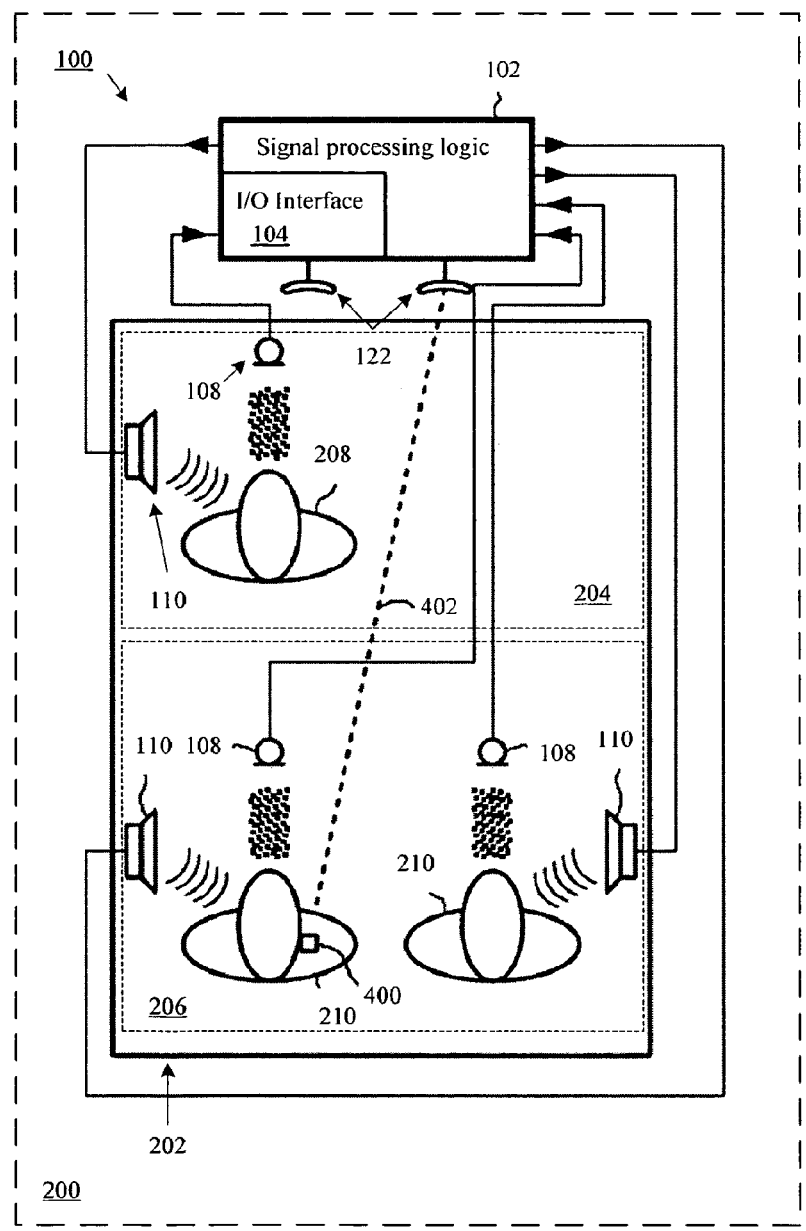
FIG. 4 is a vehicle communication system within a vehicle.

FIG. 4 shows a vehicle communication system 100 within a vehicle 200. In FIG. 4, the vehicle communication system 100 detects a communication device 400 in the rear zone 206 that does not include an input device. The communication device 400 may comprise a hearing aid or another wearable receiver, and may include a power supply a memory, signal processing logic, and a transceiver or transmitter and receiver. In FIG. 4, the signal processing logic 102 receives audio data from the microphones 108 in both the front 204 and rear 206 zones and transmits audio data to the loudspeakers 110 in both zones. The signal processing logic 102 transmits audio data to the communication device 400 over a data link 402. The data link 402 may support one or more wireless protocols. In FIG. 4, the I/O interface 104 is shown as a unitary part of the signal processing logic 102.

In some vehicle communication systems 100 the vehicle input 108 may include directive microphones, or microphone arrays. Directive microphones may use a directive polar pattern to receive a substantial portion of a passenger's verbal utterance from a specified area while substantially rejecting or dampening signals outside of the same specified area. A vehicle communication system utilizing a microphone array may exploit a signal lag from direct and reflected speech signals arriving at separate microphones that are spaced apart.

Vehicle communication systems 100 may utilize wireless and wired connections. In some systems, ports or jacks may used within the vehicle. These ports or jacks may be connected with the vehicle's communication bus and may facilitate the exchange of audio data between a communication device and the vehicle communication system 100. In some systems, a vehicle communication system controller may analyze data received from the communication bus to determine the location of a communication device and/or a communication device configuration.

Other vehicle communication systems 100 may receive information through an on-board computer 112 or a vehicle information source 106. The information may define the type of communication device (e.g., wired or wireless), the location of a communication device within the vehicle, and if necessary the wireless protocol used by a communication device. Still other vehicle communication systems 100 may include a switch that may be actuated automatically or manually, by a user, to turn off a vehicle microphone 108 and/or vehicle loudspeaker 110 from the signal processing logic 102. The vehicle communication system 100 may be employed in automobiles, trains, aircrafts, or any other vehicle which may transport persons and/or things.

Figure 5:
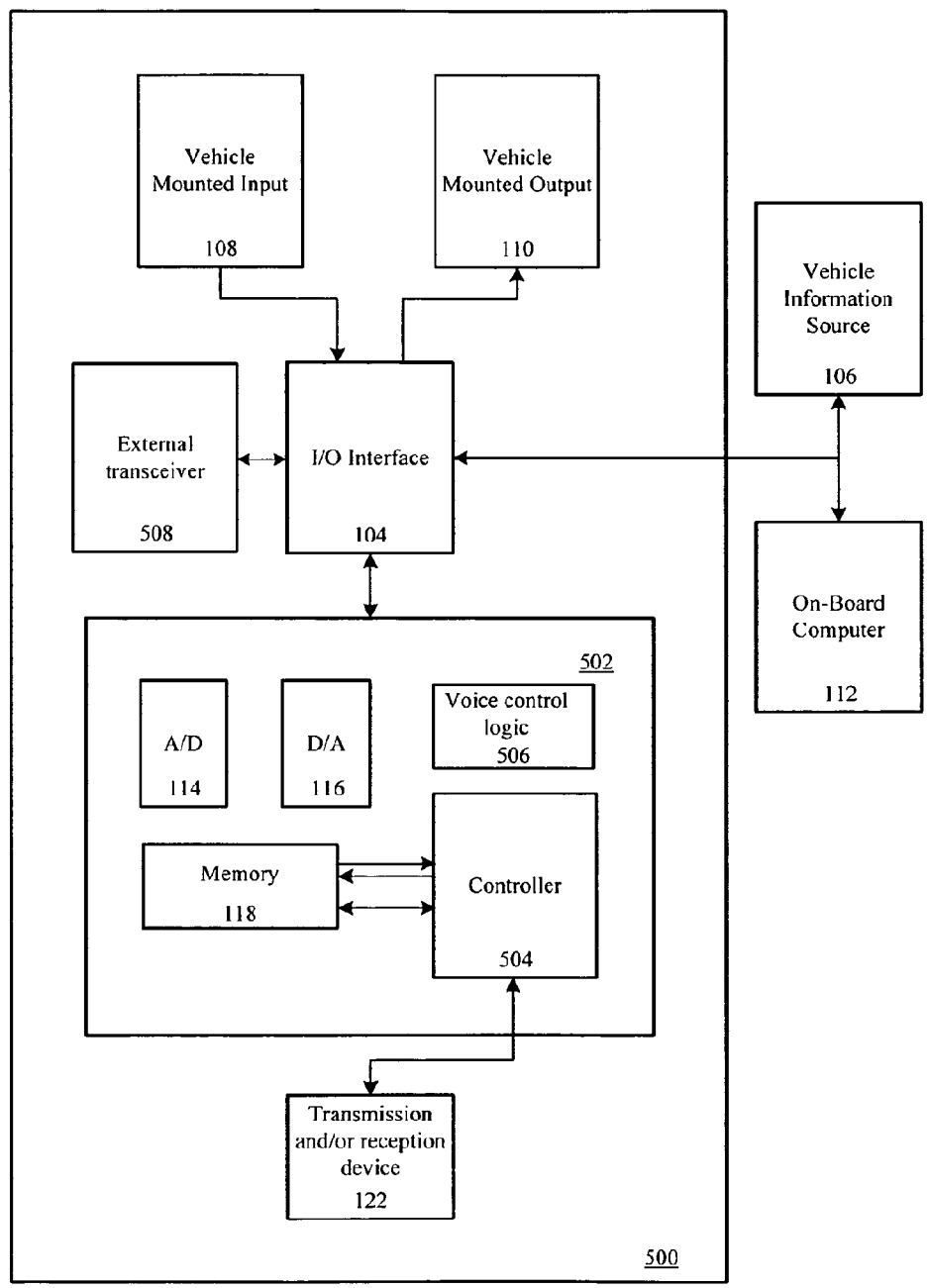
FIG. 5 shows an alternate vehicle communication system.

FIG. 5 shows an alternate vehicle communication system 500. In FIG. 5, a signal processing logic 502 includes controller 504, voice control logic 506, and external transceiver 508. The controller 504 may provide the voice control logic 506 audio data processed by the signal processing logic 502. The audio data received by the voice control logic 506 may be used to control various elements of a vehicle, such as a radio receiver, a television receiver, a compact cassette player, a compact disc player, a digital video disc player, a video cassette player, a personal computer, a video game console, a telephone, a navigation system, a window, mirror, an entertainment system, and/or climate control system. Additionally, the controller 504 may control the signal processing logic 502 to transmit audio data to or receive audio data from external transceiver 508. The external transceiver 508 may communicate with a remote party located outside of the passenger compartment 202 using a mobile or fixed audio device. Moreover, the controller 504 may be configured to control the signal processing logic 502 to transmit audio data received from a remote party to one or more communication devices without transmitting the audio data through a vehicle speaker 110.

Figure 6:
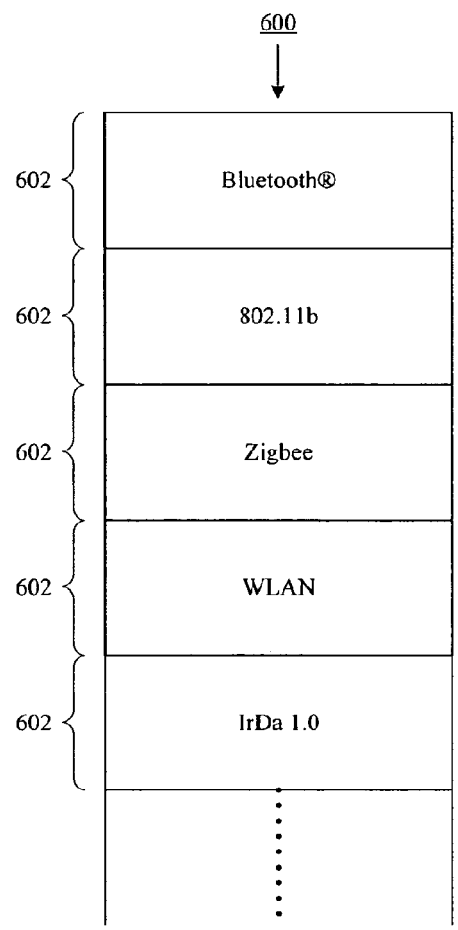
FIG. 6 shows a memory that stores protocol data.

The various protocols that allow system to transfer information may be stored in devices that store and retrieve information. In FIG. 6 the rules or standards that may allow one device to communicate wirelessly with another device are retained in a memory 600. When a communication device indicates a readiness to receive or send data, the communication device may load one or more device drivers that determine the communication protocol. Through signal transmissions and comparisons one or more protocols may be selected automatically (e.g., plug and play) or by user selection. The wireless protocols may be stored in memory locations 602, and may include Bluetooth®, 802.11b, Zigbee, WLAN, or IrDa. In other wireless or wired systems, other protocols may be used.

Figure 7:
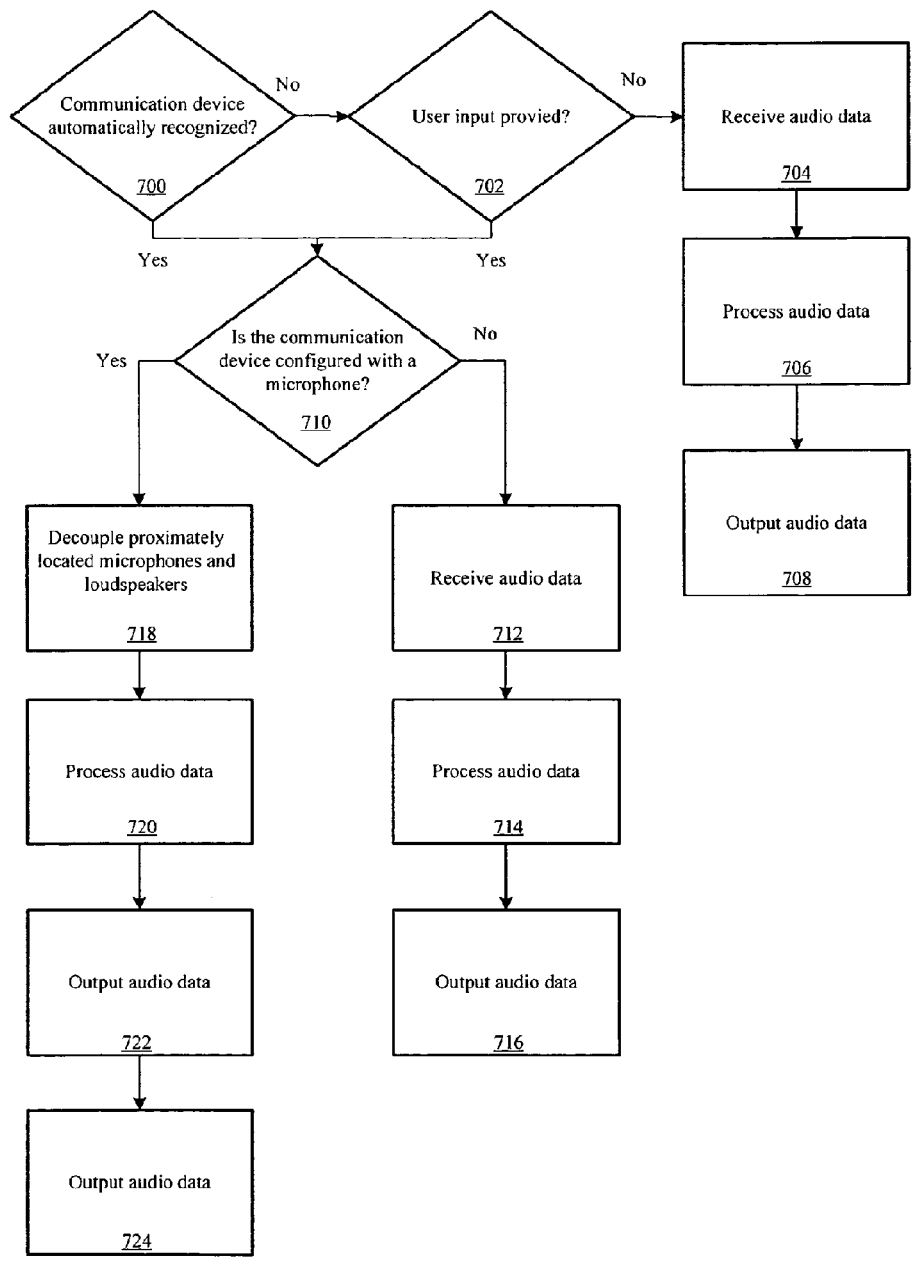
FIG. 7 is a process in which a vehicle communication system exchanges data with a wearable personal communication device.

FIG. 7 is a process in which a vehicle communication system exchanges data with a communication device. At act 700, the vehicle communication system determines whether it recognizes a communication device. Recognition may occur through an analysis of control data. The analysis may be made through a vehicle communication system controller comparing some or all of the received control data to configuration data stored in a memory space. Alternatively, the controller may search for communication devices by periodically broadcasting a control message and waiting for a return acknowledgement signal from a communication device through an event driven processing and handshake. Alternatively, an autopolling process may be used.

If a communication device is not recognized automatically, the controller may check for user input information at act 702. The controller may receive user input information through the vehicle's communication bus. If a user has not entered configuration information at act 702, the vehicle communication system may receive audio data at act 704 through a vehicle microphone or from another vehicle information source. The received audio data may be processed by signal processing logic at act 706. Processing of the audio data may include positive or negative amplification; filtering; signal conversion; echo cancellation; collection of non-primary audio data, such as meta data; spatial information extraction; energy detection; end-pointing; and/or other signal processing. At act 708, the processed data may be transmitted through vehicle loudspeakers. Depending on the source of the input audio data, the output audio data may be output through one or more of the vehicle loudspeakers.

If a communication device is recognized automatically by the vehicle communication system at act 700, or a user inputs configuration information at act 702, the vehicle communication system controller may analyze the received control data or configuration information at act 710 to determine if the communication device is configured with a microphone. If the communication device does not include a microphone, the vehicle communication system may not decouple a vehicle microphone near this communication device. Accordingly, at act 712, audio data near this communication device is received through a vehicle microphone. The received audio data may be processed by signal processing logic at act 714. Processing of the audio data may include positive or negative amplification; filtering; signal conversion; echo cancellation; collection of non-primary audio data, such as meta data; spatial information extraction; energy detection; end-pointing; and/or other signal processing. At act 716, an audio signal representing the processed data may be sent through a wired or wireless medium to one or more vehicle loudspeakers and/or a communication device loudspeaker. The audio signal may be converted into audible sound through the vehicle loudspeakers and/or a communication device loudspeaker.

If at act 710 it is determined that the communication device is configured with a microphone, the controller may turn off a vehicle microphone and loudspeaker proximately located near this communication device at act 718. At act 720, audio data in near this communication device is received through the communication device's microphone. The received audio data may be processed at act 722. Processing of the audio data may include positive or negative amplification; filtering; signal conversion; echo cancellation; collection of non-primary audio data, such as meta data; spatial information extraction; energy detection; end-pointing; and/or other signal processing. At act 724, an audio signal representing the processed data may be sent through a wired or wireless medium to one or more vehicle loudspeakers and/or a communication device loudspeaker. The audio signal may be converted into audible sound through the vehicle loudspeakers and/or a communication device loudspeaker. Some vehicle communication systems may be pre-configured to only operate with communication devices that include both a loudspeaker and a microphone, or that only include a loudspeaker.

Figure 8:
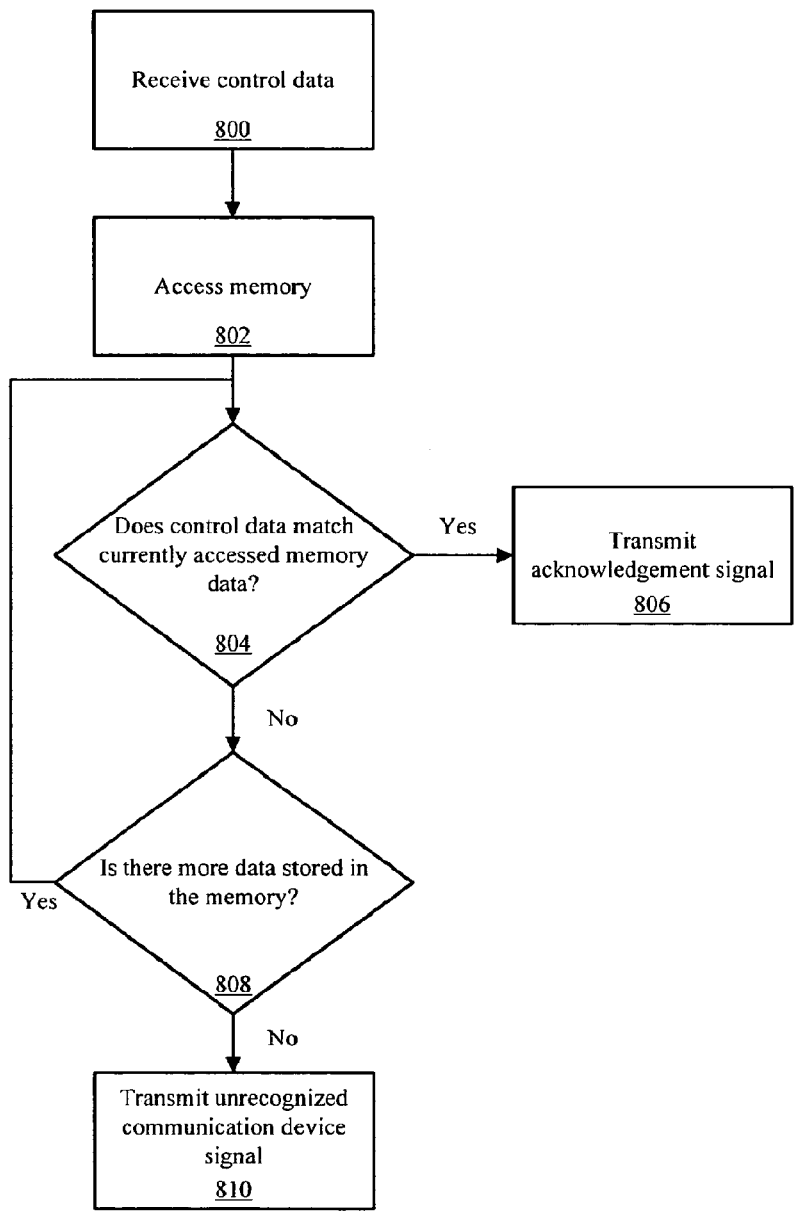
FIG. 8 is a process that recognizes a wearable personal communication device.

FIG. 8 is a process that recognizes a wearable personal communication device. At act 800, the vehicle communication system controller receives control data. The control data may be pushed to the controller by the communication device, or may be pulled by the communication device in response to a polling message transmitted by the vehicle communication system. At act 802, the controller accesses a memory that retains data identifying recognizable communication devices. The data may contain manufacturer, model, communication protocol, and/or wireless protocol information. At act 804, the controller may compare some or all of the received control data to a first accessed memory. If the data stored in the first accessed memory location matches the control data, the vehicle communication system recognizes the communication device, and the controller may cause a acknowledge signal to be transmitted to the communication device at act 806.

If the data of the first accessed memory location does not match some or all of the control data, the controller may determine whether additional memory locations containing pre-stored configuration information exist at act 808. If additional pre-stored memory locations are detected, the controller may access and compare some or all of the control data to the data stored in another memory location. The controller may continue to access and compare the pre-stored data with some or all of the control data. If no match is found, the controller may cause a signal to be transmitted at act 810 indicating to a user that a communication device is not recognized. This signal may be provided to a user through audio output by a vehicle loudspeaker and/or through video data output through a vehicle information source, such a display screen.

Figure 9:
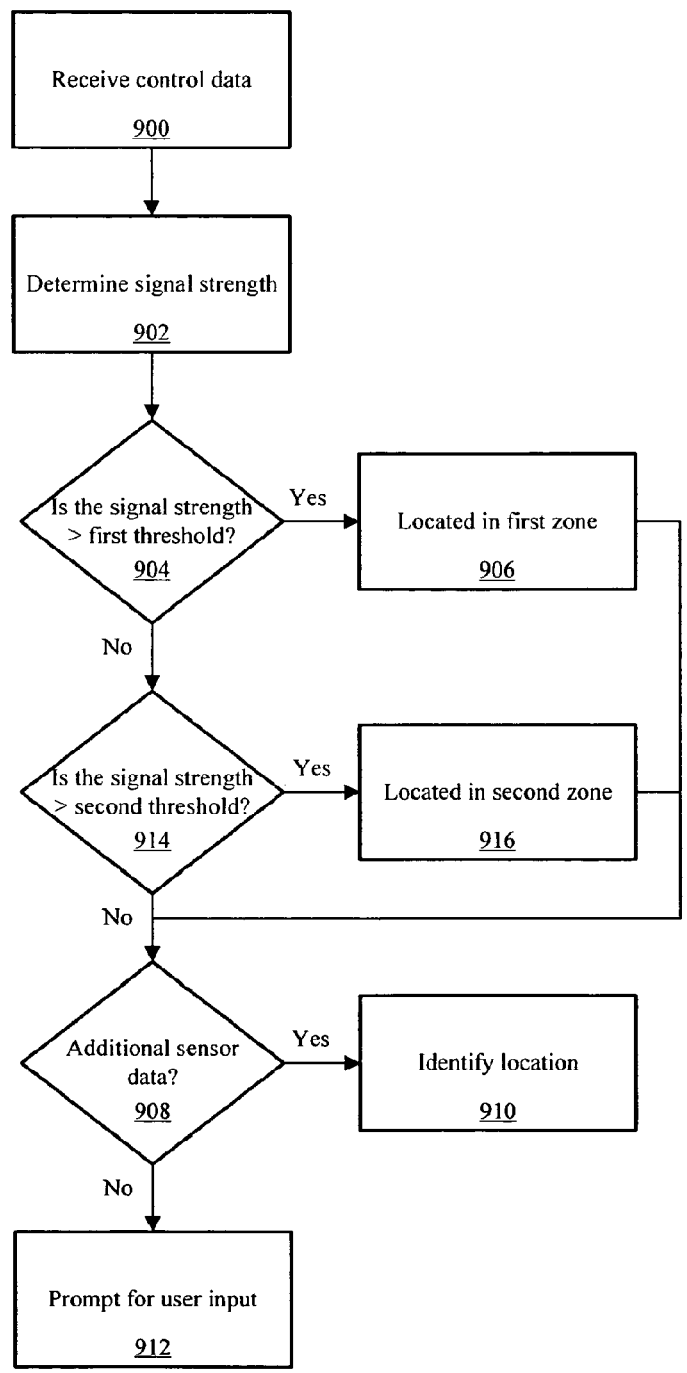
FIG. 9 is a process that identifies the location of a wearable personal communication device.

FIG. 9 is a process that identifies the location of a wearable personal communication device. At act 900, the vehicle communication system controller receives control data from a communication device. The control data may be pushed to the controller by the communication device, or may be pulled by the communication device in response to a polling message transmitted by the vehicle communication system. At act 902, the controller may determine the signal strength of the communication device.

The communication device's signal strength may be compared to a first threshold at act 904. If the signal strength exceeds the first threshold value, the controller may recognize that the communication device is in a first zone at act 906. At act 908, the controller checks for additional vehicle sensor data, such as audio data, weight sensor data, seat belt engagement data, and/or vehicle acceleration data. If such data is identified, the controller may use this data in combination with the threshold data to identify a more particular location of the communication device at act 910. If additional vehicle sensor data does not exist, the vehicle communication system may prompt the user for more information through a vehicle loudspeaker at act 912. Alternatively, the vehicle communication system may prompt the user for more information through a vehicle information source, such a display screen.

If at act 904, the signal strength does not exceed the first threshold, the controller may determine whether the signal strength exceeds a second threshold value at act 914. If the second threshold value is exceeded, the controller may recognize that the communication device is in a second zone at act 916. The controller may then continue to identify a more particular location of the communication device. The number of threshold comparisons may be configured to match the number of zones recognized by a vehicle communication system.

Figure 10:
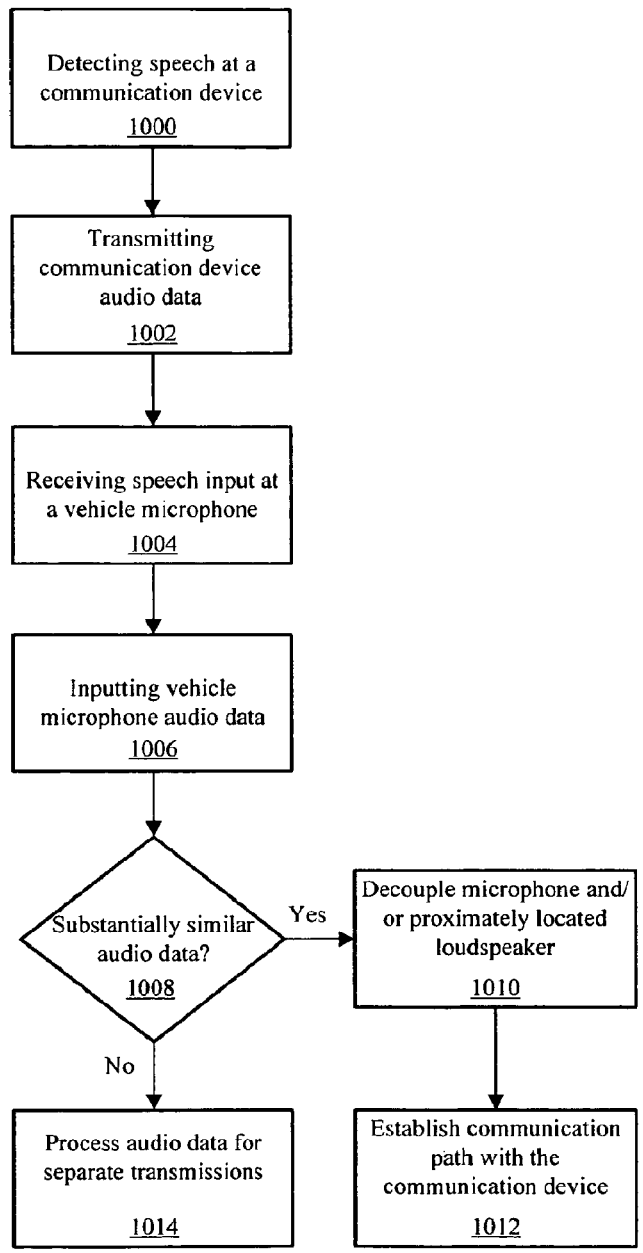
FIG. 10 is an alternative process that identifies the location of a wearable personal communication device.

FIG. 10 is an alternative process that identifies the location of a wearable personal communication device. At act 1000 speech is detected by a communication device input. Audio data corresponding to this speech is transmitted to the vehicle communication system's signal processing logic at act 1002. At act 1004, a vehicle microphone receives speech input. At act 1006, audio data corresponding to the speech received at the vehicle microphone is input into the signal processing logic. The signal processing logic compares the audio data received from the vehicle microphone and the communication device and compares the audio data at act 1008 to determine if the audio data is substantially similar. If the audio data is substantially similar, the vehicle microphone and/or a vehicle loudspeaker may be decoupled at act 1010 and a communication path may be established with the communication device at act 1012. If the audio data is not substantially similar, the vehicle communication system may process the audio data for transmission to separate outputs at act 1014. Accordingly, the audio data received from the communication device may be transmitted to a vehicle loudspeaker, vehicle information source, and/or remote party, and the audio data received from the vehicle microphone may be transmitted to a communication device, a vehicle information source, and/or a remote party.

The methods and processes may be encoded in a signal bearing medium, a non-transitory computer readable medium such as non-transitory memory, programmed within a device such as one or more integrated circuits, or processed by a controller or a computer. If the methods are performed by software, the software may reside in a memory resident to or interfaced to the signal processing logic 102 (or 502), the controller 120 (or 504), or any type of communication interface. The memory may include an ordered listing of executable instructions for implementing logical functions. A logical function may be implemented through digital circuitry, through source code, through analog circuitry, or through an analog source such as through an electrical, audio, or video signal. The software may be embodied in any computer-readable non-transitory medium or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may comprise any means that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software may be printed, as the software may be electronically stored as an image or in another format (e.g., through an optical scan), then compiled, and/or interpreted or otherwise processed. The processed medium may then be stored in a computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method of communicating through a vehicle communication system associated with a vehicle, the vehicle including at least a first zone and a second zone, the method comprising:

determining, by a vehicle communication system controller, a signal strength of a wearable personal communication device;

determining, by the vehicle communication system controller, if the wearable personal communication device is in the first zone within the vehicle based, at least in part, on a comparison of the signal strength with a first threshold; and if the wearable personal communication device is determined to be within the first zone, decoupling from signal processing logic both a vehicle microphone in the first zone and a vehicle mounted speaker in the first zone;

wherein the wearable personal communication device includes at least one of an acoustic input device and output device, the method further including, if the wearable personal communication device is determined to be within the first zone:

coupling to signal processing logic at least one of a vehicle speaker in a second zone of the vehicle and a microphone in the second zone of the vehicle; and coupling to the signal processing logic the at least one of the acoustic input device and the output device of the wearable personal communication device.

2. The method according to claim 1, further comprising:

receiving an acoustic signal at the signal processor logic from the wearable personal communication device within the vehicle; and generating, by the signal processing logic, an acoustic output to the vehicle speaker in the second zone, the acoustic output based on the received acoustic signal.

3. The method according to claim 1, further comprising:
receiving an acoustic signal at the signal processor logic from the microphone; and
generating, by the signal processing logic, an acoustic output to the wearable personal communication device with the vehicle, the acoustic output based on the received acoustic signal.

4. The method according to claim 1, wherein determining the signal strength includes receiving, at the vehicle communication system controller, control data from the wearable personal communication device.

5. The method according to claim 1 wherein determining, by the vehicle communication system controller, if the wearable personal communication device is in a first zone further includes checking vehicle sensor data.

6. The method according to claim 5, wherein the vehicle sensor data is at least one of weight sensor data, seat belt engagement data, and vehicle acceleration data.

7. The method according to claim 1, wherein determining, by the vehicle communication system controller, if the wearable personal communication device is in a first zone further includes prompting a user of the vehicle for more information.

8. The method according to claim 1, further comprising determining, by the vehicle communication system controller, if the wearable personal communication device is in the second zone of the vehicle based, at least in part, on a comparison of the signal strength with a second threshold.

9. A system for communicating in a vehicle, the vehicle including at least a first zone and a second zone, the system comprising: a vehicle communication system controller, the vehicle system controller for determining a signal strength associated with a wearable personal communication device, and determining if the wearable personal communication device is in the first zone of the vehicle based, at least in part, on a comparison of the signal strength with a threshold; a signal processor; and a vehicle microphone in the first zone and a microphone in the first zone, wherein the vehicle communication system controller decouples both the vehicle microphone in the first zone and the vehicle mounted speaker in the first zone from the signal processor if the wearable personal communication device is within the first zone;
wherein the wearable personal communication device includes at least one of an acoustic input device and output device, the system further comprising:
at least one of a vehicle microphone in the second zone and a microphone in the second zone, wherein the vehicle communication system controller couples the signal processor to at least one of the vehicle speaker in the second zone and a microphone in the second zone if the wearable personal communication device is within the first zone, and wherein the vehicle communication system controller couples the signal processor to the at least one of the acoustic input device and the output device of the wearable personal communication device if the wearable personal communication device is within the first zone.

10. The system according to claim 9, further comprising:
a vehicle sensor operatively coupled to the vehicle system controller, the vehicle communication system controller determining if the wearable personal communication device is in the first zone of the vehicle based, at least in part, on vehicle sensor data provided by a vehicle sensor.

11. The system according to claim 10, wherein the vehicle sensor is at least one of a weight sensor, a seat belt engagement sensor, and a vehicle acceleration sensor.

12. A non-transitory computer program product for communicating through a vehicle communication system associated with a vehicle, the vehicle including at least a first zone and a second zone, the computer program product comprising a non-transitory computer usable medium having executable computer readable program code thereon for execution by a computer, the computer readable program code comprising:
computer code for determining a signal strength of a wearable personal communication device;
computer code for determining if the wearable personal communication device is in the first zone within the vehicle based, at least in part, on a comparison of the signal strength with a first threshold; and
computer code for, if the wearable personal communication device is within the first zone, decoupling from signal processing logic both a vehicle microphone in the first zone and a vehicle mounted speaker in the first zone;
wherein the wearable personal communication device includes at least one of an acoustic input device and output device, the computer program product further including:
program code for, if the wearable personal communication device is within the first zone:
coupling to signal processing logic at least one of a vehicle speaker in a second zone of the vehicle and a microphone in the second zone of the vehicle; and
coupling to the signal processing logic the at least one of the acoustic input device and the output device of the wearable personal communication device.

13. The computer program product according to claim 9, further comprising:
program code for receiving an acoustic signal from the wearable personal communication device within the vehicle; and
program code for generating an acoustic output to the vehicle speaker in the second zone, the acoustic output based on the received acoustic signal.

14. The computer program product according to claim 9, further comprising:
program code for receiving an acoustic signal from the microphone; and
program code for generating an acoustic output to the wearable personal communication device with the vehicle, the acoustic output based on the received acoustic signal.

* * * * *